B. U. S. GYLLIN.
AUTOMOBILE AXLE REENFORCEMENT.
APPLICATION FILED APR. 26, 1919.
1,431,302.
Patented Oct. 10, 1922.
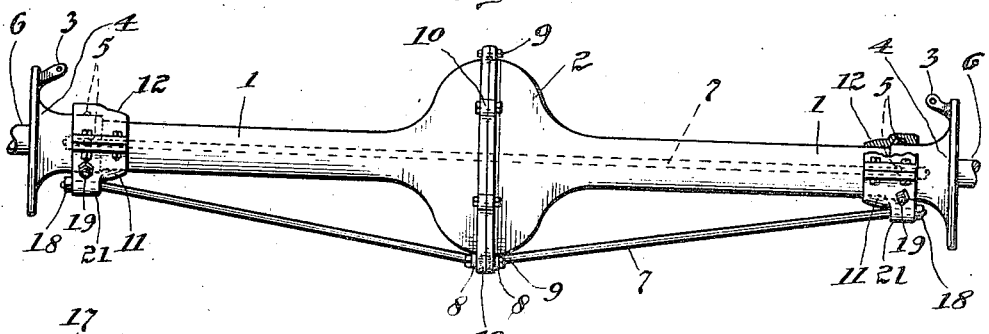
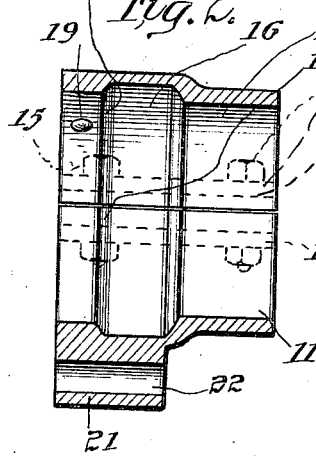
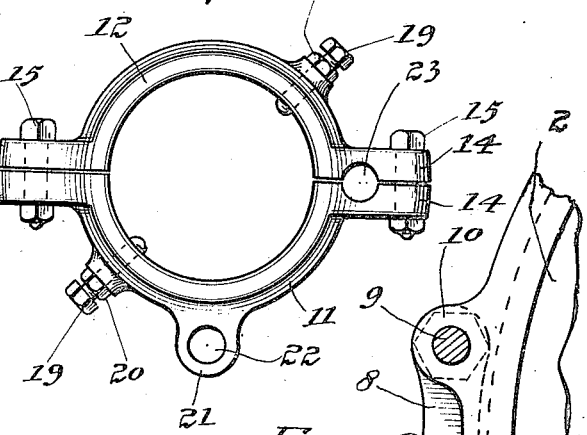
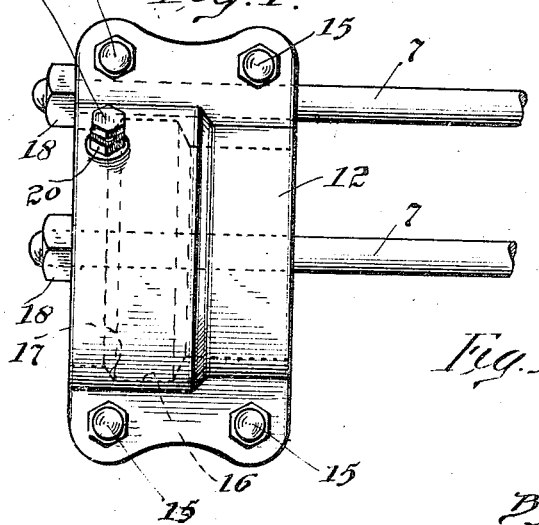
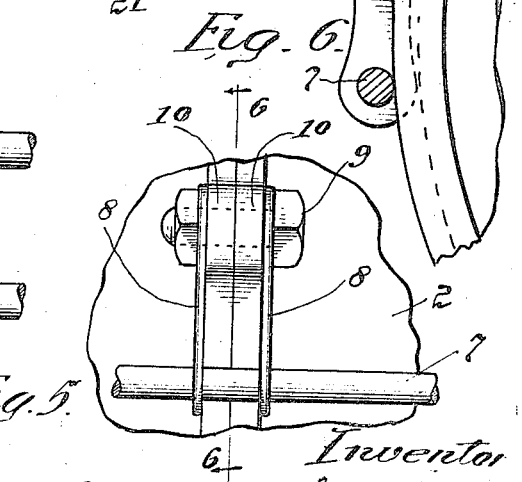
Inventor
Berth U. S. Gyllin
By Jno. G. Elliott
Atty.

Patented Oct. 10, 1922.

1,431,302

UNITED STATES PATENT OFFICE.

BERTH U. S. GYLLIN, OF CHICAGO, ILLINOIS, ASSIGNOR TO NELS W. THYBONY, OF CHICAGO, ILLINOIS.

AUTOMOBILE AXLE REENFORCEMENT.

Application filed April 26, 1919. Serial No. 292,878.

*To all whom it may concern:*

Be it known that I, BERTH U. S. GYLLIN, citizen of the United States, and a resident of the city of Chicago, in the county of Cook and State of Illinois, have invented certain new and useful Improvements in Automobile Axle Reenforcements, of which the following is a full, clear, and exact specification.

My invention relates to improvements in automobile axle reenforcements of the truss-rod type and more particularly to such a reenforcement designed and adapted for use on the rear axle of a Ford car.

While the rear axle of this car has sufficient strength for supporting light loads, it has been found that sagging or other distortions of the axle frequently results from overloading or shocks due to high speed or skidding of the car.

An object of this invention is to provide a removable truss-rod reenforcement for a rear axle which, when applied thereto, will render the axle capable of withstanding heavy shocks and strains without danger of distortion or cramping of the parts thereof, whereby undue friction and consequent short life of the axle rotating parts is avoided.

A further object is to provide a truss-rod reenforcement which may be readily and quickly applied to an axle by an unskilled person, and which shall be of light weight, strong, durable and of neat appearance.

A further object is to provide adequate means for positioning the central portion of the truss-rods without undue expense or any special machine work on the axle to be reinforced.

Other objects will appear hereinafter.

With these objects in view, my invention finds embodiment in certain features of novelty in the construction, combination and arrangement of parts, by which said objects and certain other objects are attained, all as hereinafter described with reference to the accompanying drawings, and more particularly pointed out in the appending claims.

In said drawings:

Fig. 1 is a rear elevation of a Ford rear axle, my invention finding its embodiment in the truss-rod reenforcement secured to said axle.

Fig. 2 is a detail vertical longitudinal section taken through one of the split collars in which the ends of the truss-rods are anchored.

Fig. 3 is an end elevation of one of said collars.

Fig. 4 is a top plan view of one of said collars and a portion of the truss-rods secured thereto.

Fig. 5 is a fragmentary bottom plan view showing the manner of positioning the truss-rods on the axle differential housing, and Fig. 6 is a view taken on the line 6—6 of Fig. 5 further illustrating said positioning means.

The ordinary Ford rear axle, for which my reenforcement is especially designed, comprises tubular portions, 1, a differential housing, 2, interposed between said portions, spring shackles, 3, formed integral with the flanged sleeves, 4, which are secured to the portions, 1, by means of rivets, 5, and rotating "live axles," 6, mounted inside of the axle, as shown in Fig. 1.

The central portions of the truss-rods, 7, are positioned by means of links, 8, each link having a hole at one end thereof for the reception of one of said rods, and a hole at the other end for receiving a bolt, 9, which serves to hold the differential lugs, 10, together.

By reference to Fig. 6 it will be seen that one link, 8, would perform the function of positioning the truss-rod, 7, if said link were made of thick and strong material. But, since these links are preferably stamped from thin sheet steel, two of them are employed to render the construction amply strong and durable.

Spaced split collars for anchoring the ends of truss-rods, 7, comprise substantially semi-circular parts, 11 and 12, which have oppositely extending lugs, 13 and 14, in contiguous relation and secured together by means of bolts, 15. By means of this construction the collars may be readily applied to a standard rear axle or removed therefrom, when desired, by simply turning on or off the nuts on bolts, 15.

When the parts, 11 and 12, of the split collars are secured together, an annular recess, 16, appears, as shown in Fig. 2, such conformation being necessary to provide clearance for the rivets, 5, passing through the flanged sleeve members, 4, and into the tubular portions, 1, of the axle. A shoulder, 17, at one end of the recess, 16, contacts with the heads of the rivets, 5, as shown in Fig. 1, whereby said heads serve as an abutment in positioning the collars and resisting the tension of the truss-rods, 7, when nuts, 18, provided at the ends thereof are screwed up in securing the desired reenforcement. In order to cooperate with the heads, 5, and to further secure the collars on the sleeves, 4, set screws, 19, are tapped into members 11 and 12, as shown in Fig. 3. These set screws are disposed at an angle of 45 degrees to the horizontal and are provided with lock nuts, 20, to retain the adjustment of said set screws when forced against sleeves, 4.

Each part, 11, is provided with a downwardly extending lug, 21, having an opening, 22, for the reception of the opposite ends of the lower truss-rod, 7, which is disposed in a vertical plane passing through the axis of the axle. The ends of the forward truss-rod, 7, are secured in a hole, 23, formed by registering recesses in lugs, 14, said rods being secured in said hole by means of nuts, 18, in the same manner as the lower truss-rod, 7, is secured in holes, 22.

From the foregoing description it is apparent that in order to reinforce a Ford axle it is necessary to remove a pair of bolts, 9, from the differential housing to position links, 8, on said bolts for locating the medial portions of truss-rods, 7, and then to secure in position the split collars, as shown in Fig. 1. This entire operation is quickly performed and the reenforcement to the axle thus acquired is well worth the expenditure for the inexpensive parts employed.

While I have illustrated and described the preferred form of construction for carrying my invention into effect, there might be various changes and modifications without departing from the spirit of the invention. I, therefore, do not wish to limit myself to the precise details of construction set forth, but desire to avail myself of such variations and modifications as come within the scope of the appended claims.

Having thus described my invention, what I claim and desire to secure by Letters Patent is:

1. A truss-rod reenforcement for automobile rear axles comprising in combination with an axle having a differential housing and tubular portions extending therefrom in opposite directions and sleeves riveted to said tubular portions, of split collars having diametrically opposed lugs having annular recesses for surrounding said sleeves providing a clearance for the rivets thereof, bolts passing through said lugs for clamping the split collars tightly to the housing, there being a shoulder in said recess for abutting the heads of said rivets, a truss-rod passing loosely between said lugs, and means for producing tension in said rods.

2. A truss-rod reenforcement for automobile rear axles having a differential housing and tubular portions extending therefrom comprising split collars surrounding said tubular portions and having perforated lugs extending radially therefrom, a pair of truss-rods adjustable at their ends and free to turn in said lugs, and links secured to said differential housing and having holes through which said rods are passed.

In witness whereof, I have hereunto set my hand and affixed my seal, this 24th day of April, A. D. 1919.

BERTH U. S. GYLLIN. [L. S.]

Witness:

JNO. G. ELLIOTT.